(12) United States Patent
Pytlovany

(10) Patent No.: US 6,690,992 B1
(45) Date of Patent: *Feb. 10, 2004

(54) GAME SOFTWARE MANAGEMENT SYSTEM, LINKING GAME FILES

(75) Inventor: William J. Pytlovany, Scotia, NY (US)

(73) Assignee: Gateway, Inc., Poway, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/523,864

(22) Filed: Mar. 14, 2000

Related U.S. Application Data

(63) Continuation of application No. 09/256,121, filed on Feb. 24, 1999, now Pat. No. 6,119,127.
(60) Provisional application No. 60/075,805, filed on Feb. 24, 1998.

(51) Int. Cl.$^7$ ................................................ G06F 17/30
(52) U.S. Cl. ....................................... 700/200; 700/102
(58) Field of Search ............................... 707/1, 3, 200, 707/203–205, 511, 101, 102; 463/29, 43–45; 345/333–335, 348–351, 356, 357, 507

(56) References Cited

U.S. PATENT DOCUMENTS

| | | | | |
|---|---|---|---|---|
| 5,483,654 A | * | 1/1996 | Staron et al. | 395/353 |
| 5,544,360 A | * | 8/1996 | Lewak et al. | 707/1 |
| 5,553,864 A | * | 9/1996 | Sitrick | 463/31 |
| 5,568,640 A | * | 10/1996 | Nishiyama et al. | 707/1 |
| 5,765,176 A | * | 6/1998 | Bloomberg | 707/514 |
| 5,797,139 A | * | 8/1998 | Amro | 707/100 |
| 5,819,295 A | * | 10/1998 | Nakagawa et al. | 707/203 |
| 5,830,065 A | * | 11/1998 | Sitrick | 463/31 |
| 5,832,470 A | * | 11/1998 | Morita et al. | 707/1 |
| 5,890,165 A | * | 3/1999 | Boudrie et al. | 707/202 |
| 5,966,715 A | * | 10/1999 | Sweeney et al. | 707/203 |
| 6,256,774 B1 | * | 7/2001 | O'Leary et al. | 717/120 |
| 6,393,435 B1 | * | 5/2002 | Gartner et al. | 707/200 |
| 6,393,437 B1 | * | 5/2002 | Zinda et al. | 707/201 |

OTHER PUBLICATIONS

Cowart, Robert, MASTERING WINDOWS 3.1—Special Edition, Sybex, Alameda, CA, USA, 1993, pp. 124–130, 1993.*

Cowart, Robert, Mastering Windows 3.1—Special Edition, Sybex, Alameda, CA, USA, 1993, pp. 52–61, 83–87, 121–123, 445–446, 470–499 and 732.*

* cited by examiner

*Primary Examiner*—Maria N. Von Buhr
(74) *Attorney, Agent, or Firm*—Scott Charles Richardson; Kevin E. West; Suiter - West

(57) ABSTRACT

A method and management system for locating game files on a computer-based information handling system. A storage medium is searched for game files until a file is found. Whether the file is a game file is determined. If the file is not a game file, the search is continued. If the file is a game file, whether the file executes a game application is determined. If the file does not execute a game application, the search is continued. If the file executes a game application, whether an icon is associated with the file is determined. If no icon is associated with the file, an icon is assigned to the file, a copy of the icon is placed into a games file, and the copy of the icon is linked to the file. The management method and system may be embodied on a computer readable medium containing computer readable code for causing a computer-based information handling system to execute the disclosed method. The game management system includes a search engine for locating a game program on a computer readable storage medium of a computer-based information handling system, and a database manager for creating and managing a database of files linked to the game program located on the storage medium of the computer-based information handling system.

22 Claims, 5 Drawing Sheets

GAME SOFTWARE MANAGEMENT SYSTEM, LINKING GAME FILES

CROSS-REFERENCE TO RELATED APPLICATIONS

The present application is a continuation of U.S. application Ser. No. 09/256,121 filed Feb. 24, 1999 now issued as U.S. Pat. No. 6,119,127. The present application and said application Ser. No. 09/256,121 claim the benefit of and priority under 35 U.S.C. §119(e) to U.S. Provisional Application Serial No. 60/075,805 filed Feb. 24, 1998.

FIELD OF THE INVENTION

The present invention generally relates to the field of computer-based information handling systems, and particularly to a system for managing software on a computer-based information handling system.

BACKGROUND OF THE INVENTION

Computer-based information handling systems are often utilized as gaming machines on which arcade style, adventure, sporting, or the like games are played. Present computer-based information handling systems have evolved both in the hardware and in the architecture of the operating system and software running on the hardware. This being the case, no single standard has been promulgated for the installation, storage, and running of games on the computer-based information handling systems. As a result, some games may be optimized for various versions of operating systems more so than others, causing the files that start and launch the games to be located in a random placement of directories, drives, and media. Further, newer operating system versions tend to include a registry in which games that are compatible with the registry are listed for easy identification. However, since the newer versions of operating systems are typically designed to run programs designed for older versions of the operating system (in order to maintain backwards compatibility), many new games are written specifically for the older operating system versions instead of newer versions. This is further reinforced by the intention of the game creator to create games that will run on the highest number of computer-based information handling systems, including those that are only running earlier versions of the operating system. As a result, games written for the older version of the operating system do not appear in the games registry file.

Most gamers utilizing a computer-based information handling system do not want to waste precious gaming time searching for the location and directory of every game. Game files are usually installed in specific directories created during the process of installing the game on the computer-based information handling system. Typically, the names of the directory are obscure and difficult to remember since the directories are named after the software company that publishes or distributes the game rather than the name of the game itself. Thus, it is difficult for gamers to readily locate all of the games installed on their computer-based information handling systems. The tediousness of the search for installed games increases with the increasing number of games installed, the increasing size of hard disk drives and other storage media, and the increased number of differing versions in a series of operating systems.

SUMMARY OF THE INVENTION

The present invention is directed to a method for locating game files on a computer-based information handling system. In one embodiment of the invention, the method comprises the steps of searching a storage medium for game files until a file is found, determining whether the file is a game file; if the file is not a game file, repeating the searching step; if the file is a game file, determining whether the file executes a game application; if the file does not execute a game application, repeating the searching step; if the file executes a game application, determining whether an icon is associated with the file; if no icon is associated with the file, assigning an icon to the file, placing a copy of the icon into a games file, and linking the copy of the icon to the file. In another embodiment, the present invention is directed to a computer readable medium containing computer readable code for causing a computer-based information handling system to execute the above method.

The present invention is also directed to a game management system for a computer-based information handling system. In one embodiment, the game management system comprises a search engine for locating a game program on a computer readable storage medium of the computer-based information handling system, and a database manager for creating and managing a database of files linked to the game program located on the storage medium of the computer-based information handling system.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
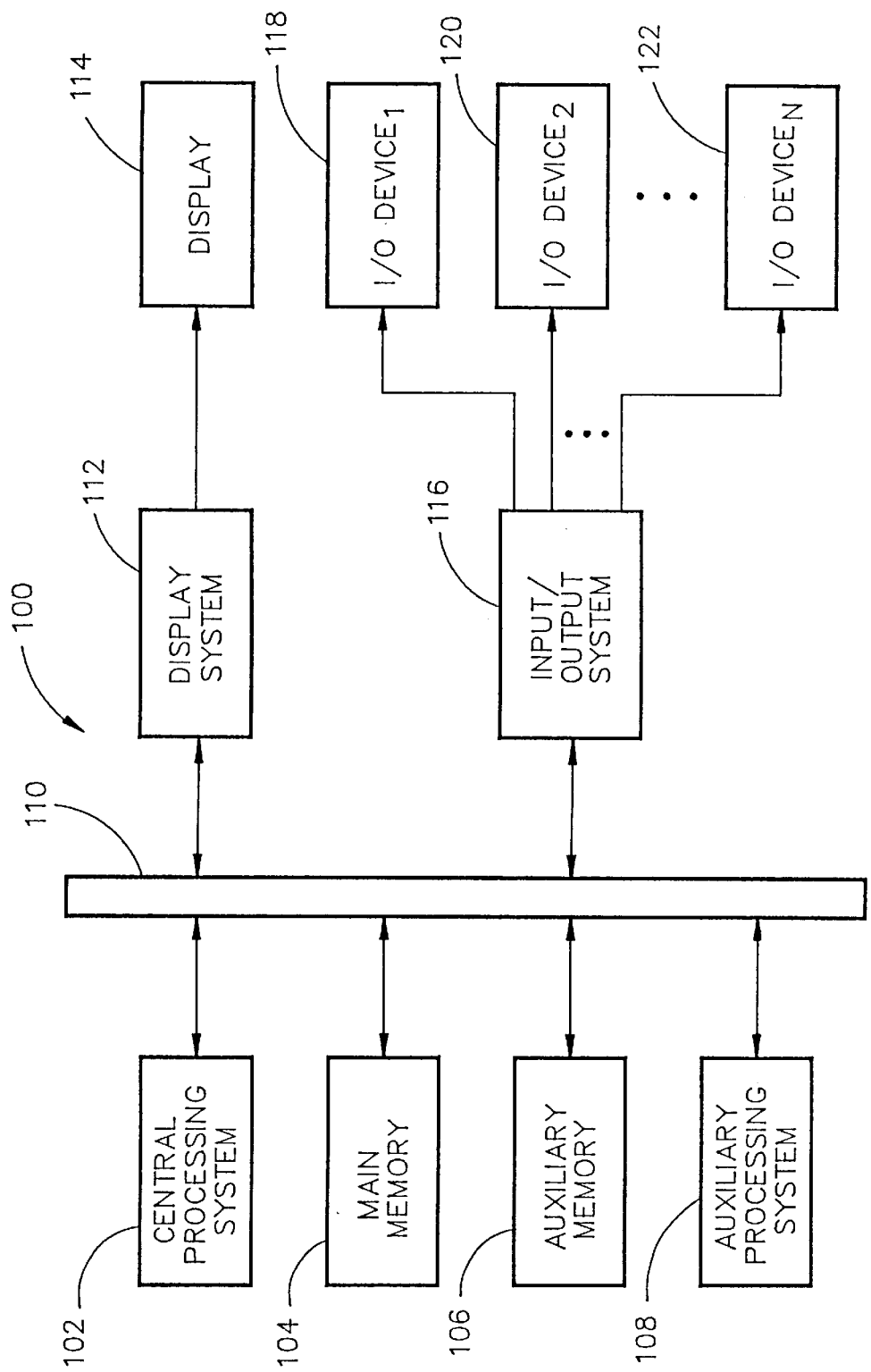
FIG. 1 is a diagram of the hardware architecture of a computer-based information handling system in accordance with the present invention.

Referring now to FIG. 1, a hardware system in accordance with the present invention is shown. The hardware system shown in FIG. 1 is generally representative of the hardware architecture of a computer-based information handling system of the present invention. A central processing system 102 controls the hardware system 100. Central processing system 102 includes a central processing unit such as a microprocessor or microcontroller for executing programs, performing data manipulations and controlling the tasks of the hardware system 100. Communication with central processor 102 is implemented through a system bus 110 for transferring information among the components of the hardware system 100. Bus 110 may include a data channel for facilitating information transfer between storage and other peripheral components of the hardware system. Bus 110 further provides the set of signals required for communication with the central processing system 102 including a data bus, address bus, and control bus. Bus 110 may comprise any state-of-the-art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Other components of hardware system 100 include main memory 104, auxiliary memory 106, and an auxiliary processing system 108 as required. Main memory 104 provides storage of instructions and data for programs executing on central processing system 102. Main memory 104 is typically semiconductor based memory such as dynamic random access memory (DRAM) and or static random access memory (SRAM). Auxiliary memory 106 provides storage of instructions and data that are loaded into main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Hardware system 100 further includes a display system 112 for connecting to a display device 114, and an input/output (I/O) system 116 for connecting to one or more I/O devices 118, 120 tip to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. The input/output system 116 may comprise one or more controllers or adapters for providing interface functions between one or more I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between hardware system 100 of the present invention and external devices, networks, or information sources. Input/output system 116 and I/O devices 118–122 preferably implement industry promulgated architecture standards, including Ethernet IEEE 802 standards (e.g., IEEE, 802.3 for broadband and baseband networks, IEEE 802.3 z for Gigabit Ethernet, IEEE 802.4 for token passing bus networks, IEEE 802.5 for token ring networks, IEEE 802.6 for metropolitan area networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of hardware system 100 of FIG. 1 by one having ordinary skill in the art would not depart from the scope or the spirit of (he present invention.

Figure 2:
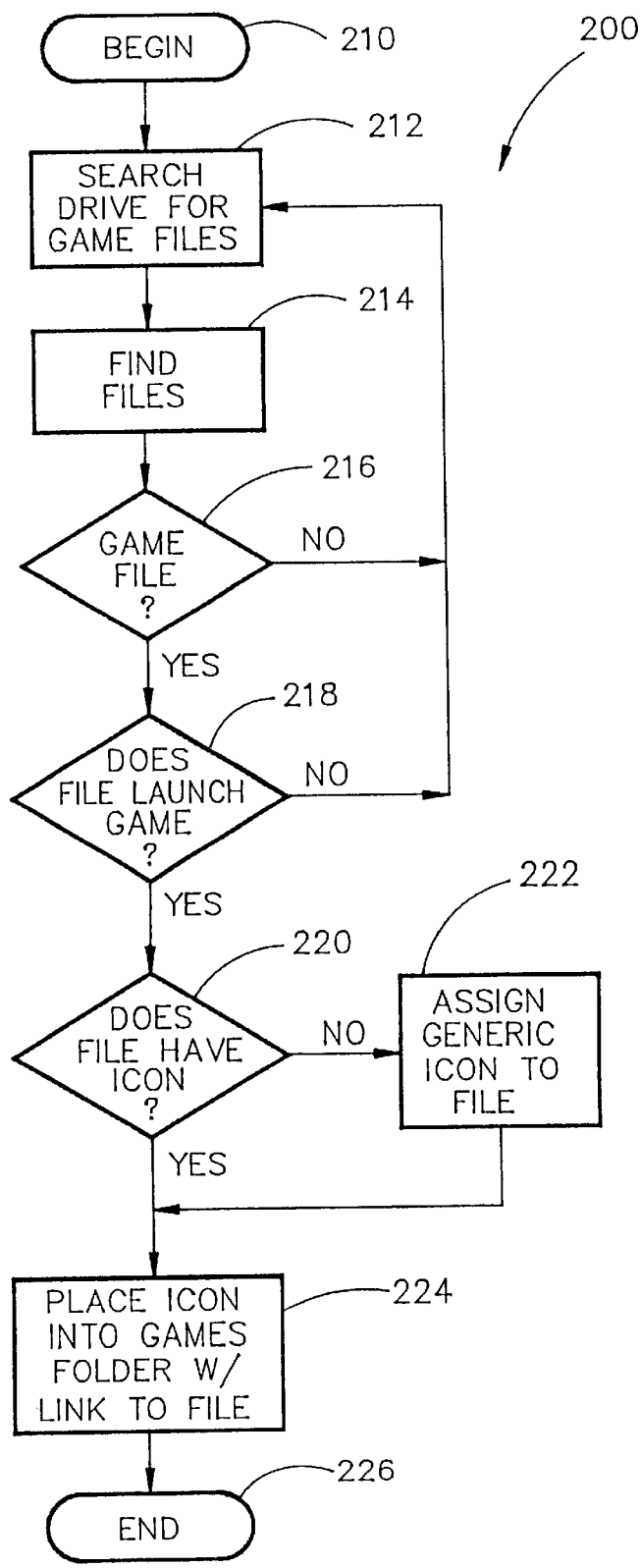
FIG. 2 is a flow diagram generally depicting the overall game search process in accordance with the present invention.

Referring now to FIG. 2, a flow diagram of the overall game searching process in accordance with the present invention is shown. Upon initiation 210 of the game searching process 200, one or more drives or similar storage media are searched for game files that may be installed thereon 212. The searched drive or similar storage media may be, for example, any hard disk drive, floppy disk drive, CD-ROM drive, DVD drive RAM disk drive, network drive or URL, or any main memory 104, auxiliary memory 106, auxiliary processing system 108, I/O device 118–122 of I/O system 116, of computer-based information handling system as shown in FIG. 1. The drive or similar storage media is searched until a file is found that may be a game file 214. A determination is made whether the found file is in fact a game file 216. If the found file does not fall in the genus of game files, then the drive is continued to be searched until a file is found that falls within the game file genus 212. Often, several files that are associated with a particular game are installed along with the file that is the actual game. The process is intended to search for and find the specific file that launches and executes the game. Thus, a file may fall within the genus of game files, yet not be the specific file that launches and executes the game. It must be determined whether a file falling within the game file genus is also an executable game file species.

Process 200 determines whether a found game file is the type of file that launches and executes a game 218. If the found file is not a game launching species, then the drive is continued to be searched for game files 212. If the found file is a game launching species, then process 200 determines whether the game file has an icon associated therewith 220. If the game file does not have an associated icon, a generic game icon is assigned to the gaming file 222. The game icon, whether preexisting or assigned to the file, is placed into a games folder, and a link is generated associating the game icon with the executable game file 224. The game icon and associated link to gaming file in the games folder may be referred to as a shortcut to the executable game file. Process 200 may be continued until the drive has been searched in its entirety. Further, process 200 may be implemented on all drives and similar storage media (e.g., CD-ROM) until all games installed on computer-based information handling system 100 as shown in FIG. 1 are referenced by a shortcut icon in the games folder. The user of computer-based information handling system 100 now has organized all games organized in a single location for ready selection and access to each and any game. Process 200 may end at step 226 at any appropriate time.

Figure 3:
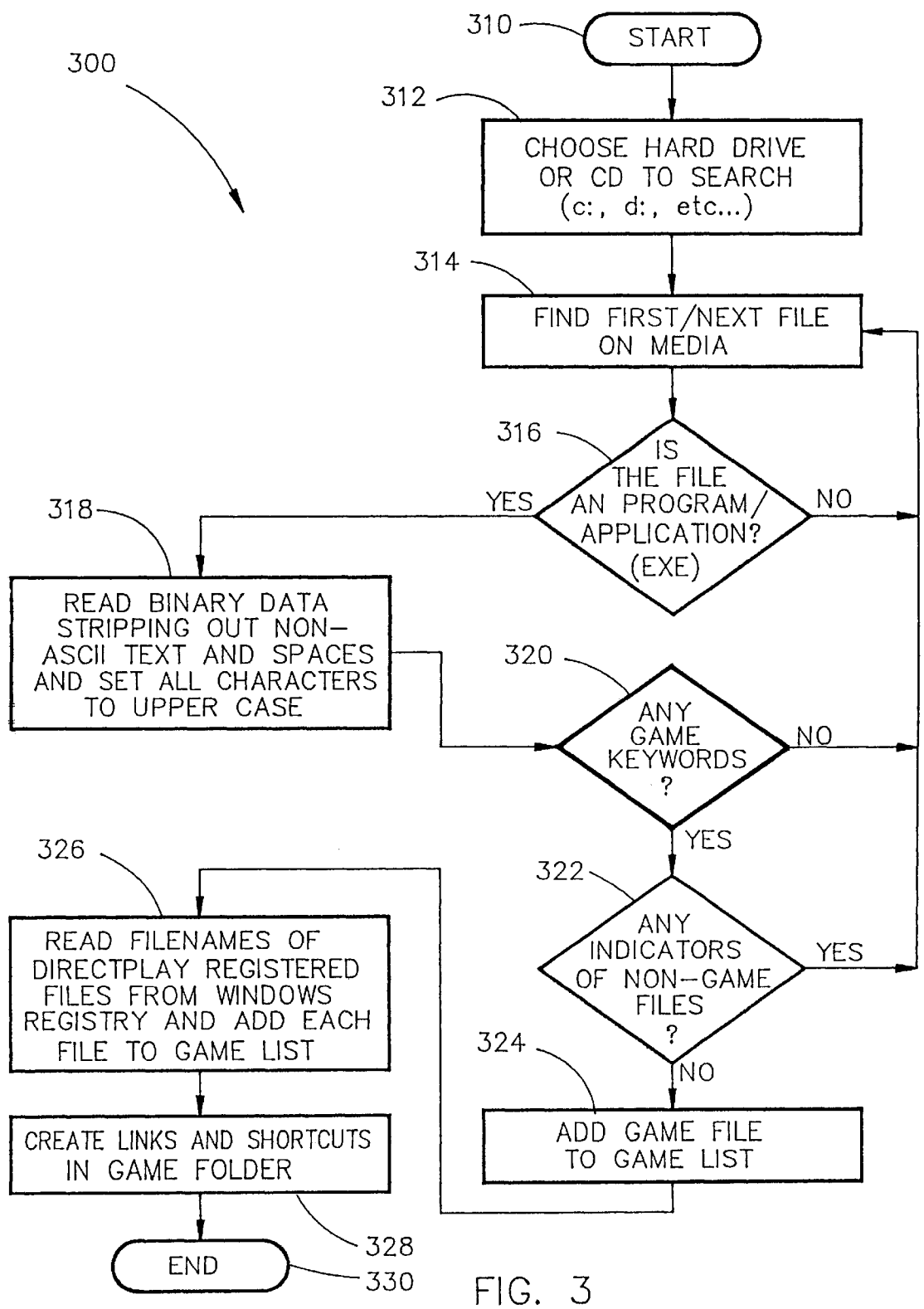
FIG. 3 is a flow diagram generally depicting a method for determining game files from non-gaming files in accordance with the present invention.

Referring now to FIG. 3, a block diagram of a gaming search process in accordance with the present invention is shown. The process 300 illustrates in some detail the manner in which executable game files are filtered from the genus that includes all game files. At the initiation 310 of process 300, a particular drive or similar media is chosen to be searched 312. The next file, in the present case the first file, that may be a game file is found on the selected media 314. Process 300 determines whether the found file is a program or application, i.e. whether the file is an executable file 316. A file name may include an extension or suffix that, under the rules of the particular operating system, indicates that the file is an executable file. For example, the file may be listed as its file name, followed by the file type suffix, as in "filename.exe" wherein the name of the file is "filename" and the type of file is "exe" for executable. The name of the file and the file type extension may be separated by punctuation such as a period. If the found file is not determined to be an executable file, then the selected drive or media is searched for the next file 314.

If the found file is determined to be an executable file, then the file is preprocessed to determine specifically whether the file is in fact a game file 318. The preprocessing process may comprise reading the binary data in the found executable file to a memory, stripping out any non-ASCII text and spaces, and setting all characters to uppercase letters. The resulting file is then searched for any keywords that would indicate that the file is a game file 320. For example, the contents of the found executable file may be compared to a precompiled list of keywords that frequently appear in game files. Such game indicating keywords may include "JOYSTICK", "&GAME", "GAMEOVER", "SPRITE", "LOADGAME", "PLAYER", "MULTIPLAYER", "PAUSE GAME", etc. Further, the keywords may include the names of popular game companies and developers. If no game indicating keywords are found in the executable file, then the selected drive or medial is searched for the next file 314.

If the found executable file is determined to include at least one game indicating keyword, then process 300 determines whether the executable file includes any non-game file indicators that would preclude the file from being conclusively a game file that would launch and execute a game 322. For example, the contents of the found executable file may be compared to a precompiled list of files that are known not to be game files. Such non-game files may include install programs, setup programs, uninstall programs, system profiler programs, multimedia utilities, etc. If a non-game indicator is detected in the executable file, then the selected drive or media is searched for the next file 314. Otherwise, the file is added to a list of found games 324.

If the operating system contains a registry in which the filenames of installed files are stored and organized into categories, then the registry is searched for registered game files 326. For example, the Windows 95 operating system of Microsoft Corporation includes a registry of games files under the directory "DirectPlay." All games registered under "DirectPlay" are further added to the list of found games 326. After all media have been searched, including any registry, then a shortcut for each game file in the list of found games may be placed into a game folder which a link from each shortcut to the actual location of the corresponding found game 328. At that point, process 300 terminates.

Figure 4A:
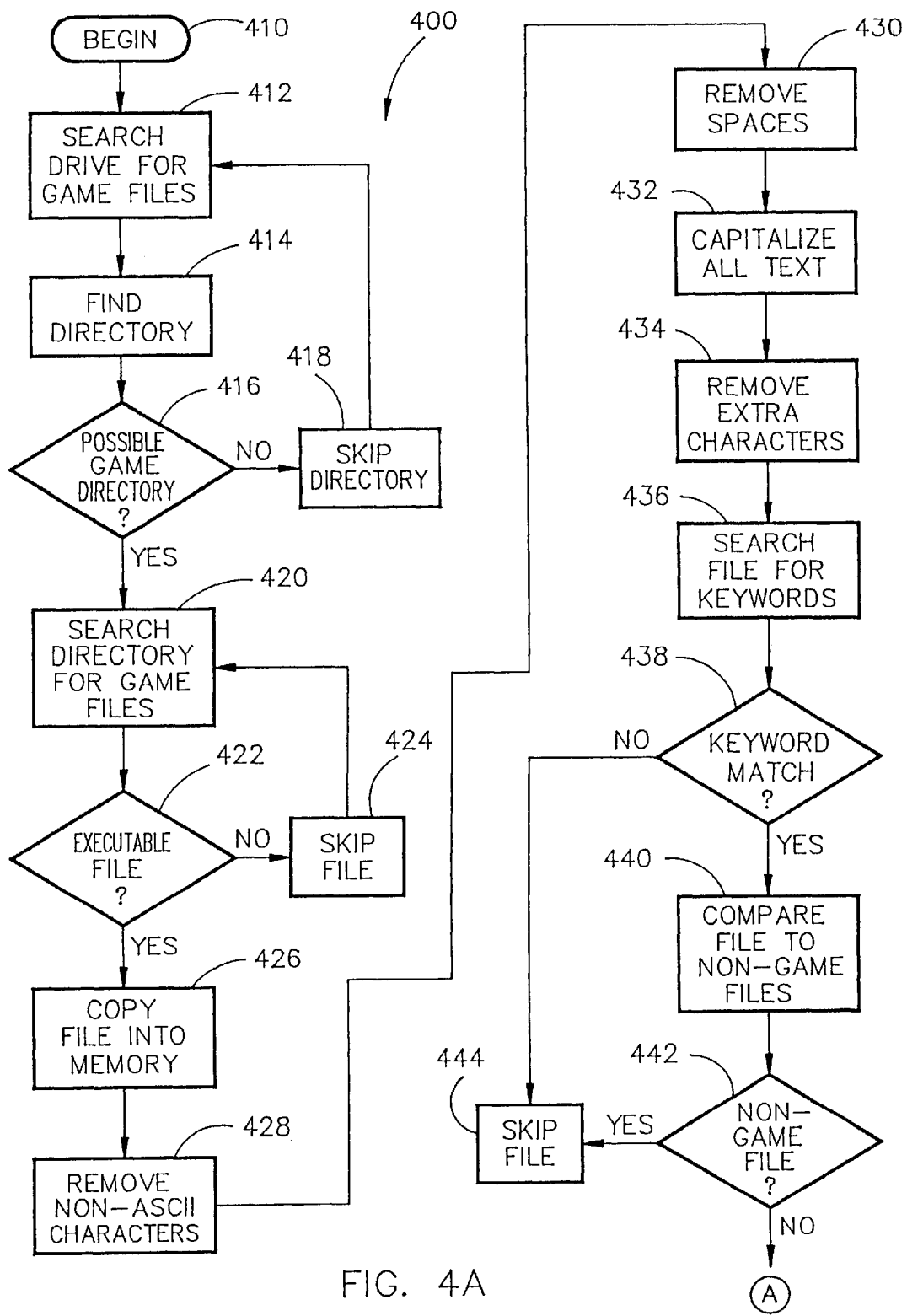
FIGS. 4A and 4B are flow diagrams depicting in detail a method for finding and compiling a list of game files in accordance with the present invention.
Figure 4B:
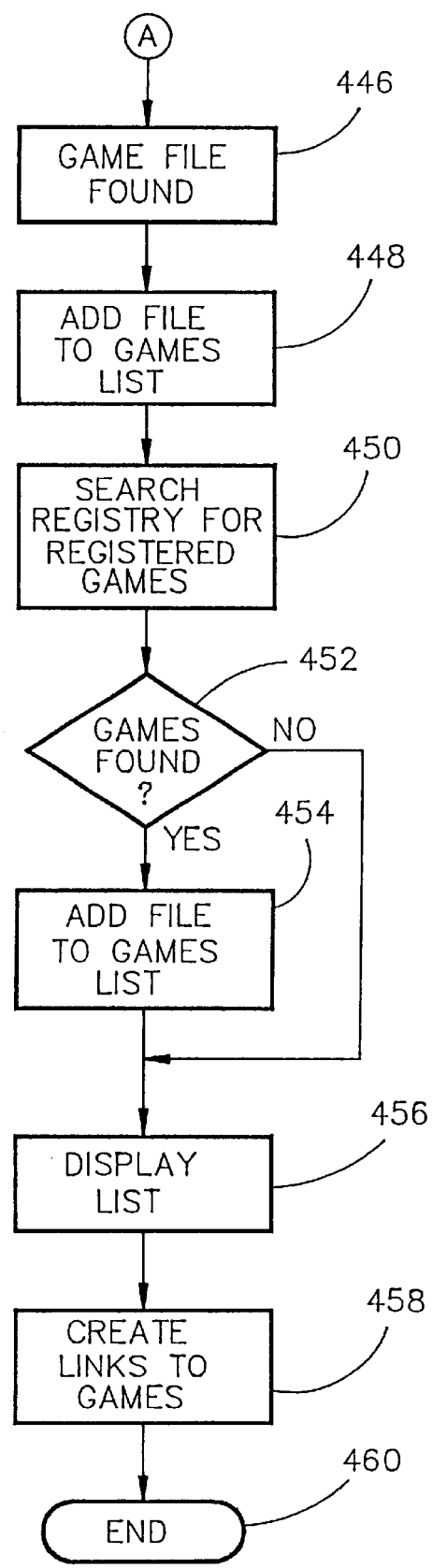

Referring now to FIGS. 4A and 4B, a game searching process in accordance with the present invention is shown. The process 400 initiates 410 and begins to search a selected hard drive or similar storage medium as discussed herein 412. As the hard drive or media is searched, the process will search directories in which game files may be located 414. A determination is made whether the directory is a possible game directory 416. If the directory is determined not to be a possible game directory, then that directory is skipped and not searched for game files 418, and the search process continues for other directories on that drive or storage medium 412. The category of skipped non-game directories may include directories known not to contain game files, for example temporary directories, cache directories, font directories, history directories, help directories, system directories, etc. These types of directories may be identified, for example, by the name of the directory (e.g., "temp", "cache", "help", "system"), by the content of the file types located therein from the file extension of suffix, or by location of the directory (e g., being a subdirectory of a directory known not to contain game files).

If it is determined that the directory is a possible game directory, the directory is searched for game files located therein 420. Files found located within the possible game directory are tested to determine whether the file is an executable file as described herein 422. If the file is not an executable file, the file is skipped at step 424 and the possible game directory is searched for executable game files 420. If the file is an executable file, for example, then the file is copied into memory 426, non-ASCII characters are removed from the copied executable file 428, spaces are removed from the copied executable file 430, all remaining text is capitalized 432, and extraneous characters are removed from the copied executable file 434. Such extraneous characters may include, for example, Unicode text, a character encoding standard in which characters are encoded using two bytes of information.

The contents copied executable file processed as described is searched for keywords that tend to indicate that the file is a game file as described herein 436. A determination is made whether the contents of the file match any of the known game indicating keywords 438. If there are no game indicating keywords contained in the file, then the file is skipped 444, and the search continues for further game files. In the event that the file contains a game indicating keyword, the file is compared to non-game files 440. A determination is made whether the file, even though it may contain a game indicating keyword, is in fact a non-game file 442. For example, a text file may contain a game indicating keyword, yet the text file is not an executable game file. If the file is in fact a non-game file, then the file is skipped, and the search continues for further game files.

If the game is not a non-game file, then a game file has been found 446. The file is added to a games list 448. Further, the registry of the computer-based information handling system 100 is searched for registered games 450, and a determination is made whether the registry includes any registered games 452. If any game is found in the registry, the game is added to the games list 454. In any event, the games list is displayed 456 for viewing by a user of computer-based information handling system 100. A link to the found game file or files will be created and contained at a single location 458. The user has the ability to select for which of the found game files a link will be created. Alternatively, the creation of the game links may be implemented automatically. The game links or shortcuts may be stored in a central location which itself may be organized into specific gaming categories, e.g., sports games, flight simulators, fantasy role playing games, arcade games, favorite games, etc. Process 400 then terminates 460.

In accordance with the present invention, a software management system for information handling system 100 of FIG. 1 may be tangibly embodied as a collection of modules implemented by and executing on the hardware system of information handling system. As such, information handling system 100 becomes specifically configured as each module when performing the function of a particular module. The modules of the software management system may include a search engine for locating a software program on a computer readable storage medium of computer-based information handling system 100, and a database manager for creating and managing a database of files linked to the software program located on the storage medium of the computer-based information handling system 100. The database manager may be adapted to assign said linked files to a directory, and the search engine may be adapted to locate an icon associated with the software program and to display the icon in association with one of the linked files, the icon being for activating the software program via said one of the linked files. The software management may further include a tester for testing the linked files and an editor for editing the database of linked files such that a file linked to an additional software program may be added to the database. The database manager may further include a prompter for prompting the search engine to locate a software program on an additional computer readable storage medium. The search engine may include a directory search limiter for limiting software searches to a portion of the computer readable storage medium. Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as the auxiliary memory of FIG. 1, for example in a hard disk drive or in a removable memory such as an optical disk for utilization in a CD-ROM drive, a floppy disk for utilization in a floppy disk drive, floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the gaming management system of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A game management system for a computer-based information handling system, comprising:
   a search engine for locating a game program on a computer readable storage medium of the computer-based information handling system;
   a database manager for creating and managing a database of files linked to the game program located on the storage medium of the computer-based information handling system; and
   a tester for testing the linked files.

2. A game management system as claimed in claim 1, wherein said database manager is adapted to assign said linked files to a directory.

3. A game management system as claimed in claim 1, wherein said search engine is adapted to locate an icon associated with the game program and to display the icon in association with one of the linked files, the icon for activating the game program via said one of the linked files.

4. A game management system as claimed in claim 1, further comprising an editor for editing the database of linked files such that a file linked to an additional game program may be added to the database.

5. A game management system as claimed in claim 1, wherein said database manager includes a prompter for prompting said search engine to locate a game program on an additional computer readable storage medium.

6. A game management system as claimed in claim 1, wherein said search engine includes a directory search limiter for limiting game searches to a portion of the computer readable storage medium.

7. A game management system for a computer-based information handling system, comprising:
   means for locating a game program on a computer readable storage medium of the computer-based information handling system;
   means for creating and managing a database of files linked to the game program located on the storage medium of the computer-based information handling system;
   means for editing the database of linked files such that a file linked to an additional program may be added to the database; and
   means for testing the linked file.

8. A game management system as claimed in claim 7, wherein said means for creating and managing a database is adapted to assign said linked files to a directory.

9. A game management system as claimed in claim 7, wherein said locating means is adapted to locate an icon associated with the game program and to display the icon in association with one of the linked files, the icon for activating the game program via said one of the linked files.

10. A game management system as claimed in claim 7, wherein said means for creating and managing a database includes a prompter for prompting said search engine to locate a game program on an additional computer readable storage medium.

11. A game management system as claimed in claim 7, wherein said locating means includes a directory search limiter for limiting game searches to a portion of the computer readable storage medium.

12. A game management system for a computer-based information handling system, comprising:

a search engine for locating a game program on a computer readable storage medium of the computer-based information handling system, the search engine locating the game program suitable for launching the game program wherein said search engine is adapted to locate an icon associated with the game program and to display the icon;

a database manager for creating and managing a database of files linked to the game program located on the storage medium of the computer-based information handling system; and a tester for testing the linked file.

13. A game management system as claimed in claim 12, wherein said database manager is adapted to assign said linked files to a directory.

14. A game management system as claimed in claim 12, wherein said search engine is adapted to locate an icon associated with the game program and to display the icon in association with one of the linked files, the icon for activating the game program via said one of the linked files.

15. A game management system as claimed in claim 12, further comprising an editor for editing the database of linked files such that a file linked to an additional game program may be added to the data base.

16. A game management system for a computer-based information handling system, comprising:

a search engine for locating a game program on a computer readable storage medium of the computer-based information handling system; and a database manager for creating and managing a database of files linked to the game program located on the storage medium of the computer-based information handling system, wherein the search engine locates the game program by searching the computer readable storage medium until a file is found, determining whether the file is a game file, and, if the file is a game file, determining whether the file executes a game application; and wherein, if the file found by the search engine executes a game application, the database manager places a copy of an icon associated with the application into a games file, and links the copy of the icon to the file.

17. The game management system as claimed in claim 16, wherein the database manager assigns the linked files to a directory.

18. The game management system as claimed in claim 16, wherein the search engine locates an icon associated with the game program and to display the icon in association with one of the linked files, the icon for activating the game program via one of the linked files.

19. The game management system as claimed in claim 16, further comprising a tester for testing the linked files.

20. The game management system as claimed in claim 16, further comprising an editor for editing the database of linked files such that a file linked to an additional game program may be added to the database.

21. The game management system as claimed in claim 16, wherein the database manager includes a prompter for prompting the search engine to locate a game program on an additional computer readable storage medium.

22. The game management system as claimed in claim 16, wherein said search engine includes a directory search limiter for limiting game searches to a portion of the computer readable storage medium.

* * * * *